J. N. ROBERTSON.
FREE OIL JOURNAL LUBRICATION.
APPLICATION FILED JAN. 22, 1921.

1,404,651.

Patented Jan. 24, 1922.

Inventor
Jasper N. Robertson

By William C. Linton
Attorney

UNITED STATES PATENT OFFICE.

JASPER NEWTON ROBERTSON, OF ST. THOMAS, ONTARIO, CANADA.

FREE-OIL JOURNAL LUBRICATION.

1,404,651.        Specification of Letters Patent.        Patented Jan. 24, 1922.

Application filed January 22, 1921. Serial No. 439,316.

*To all whom it may concern:*

Be it known that I, JASPER NEWTON ROBERTSON, a citizen of the United States of America, and a resident of the city of St. Thomas and Province of Ontario, Canada, have invented certain new and useful Improvements in Free-Oil Journal Lubrication; and I do hereby declare that the following is a full, clear, and exact description of the invention, such as will enable others skilled in the art to which it appertains to make and use the same.

This invention has reference to improvements in lubricating devices for use in connection with journal boxes of that type commonly employed upon railway rolling stock, having for an object to provide a simple and effectual form of means for conveying lubricant to an axle mounted therein in order that such lubricant will be evenly distributed about the bearing surfaces of the axle whereby to reduce friction to minimum and to eliminate the frequent so-called "hotboxes" commonly occurring at the present time, by reason of faulty lubrication.

It is also an object of this invention to provide a lubricating device for journal boxes which will eliminate the necessity of employing cotton waste as a lubricant retaining and conveying means, which waste requires a considerable amount of lubricant for its saturation, and oftentimes, due to jar and vibration of the shock, when in motion, becomes displaced and thus causes overheating of the contacting bearing surfaces, with detrimental conditions resulting therefrom.

Other objects will be in part obvious and in part pointed out hereinafter.

In order that the invention and its mode of operation may be readily understood by persons skilled in the art, I have in the accompanying drawings, and in the following detailed description based thereon, set out one embodiment of the same.

Figure 1:
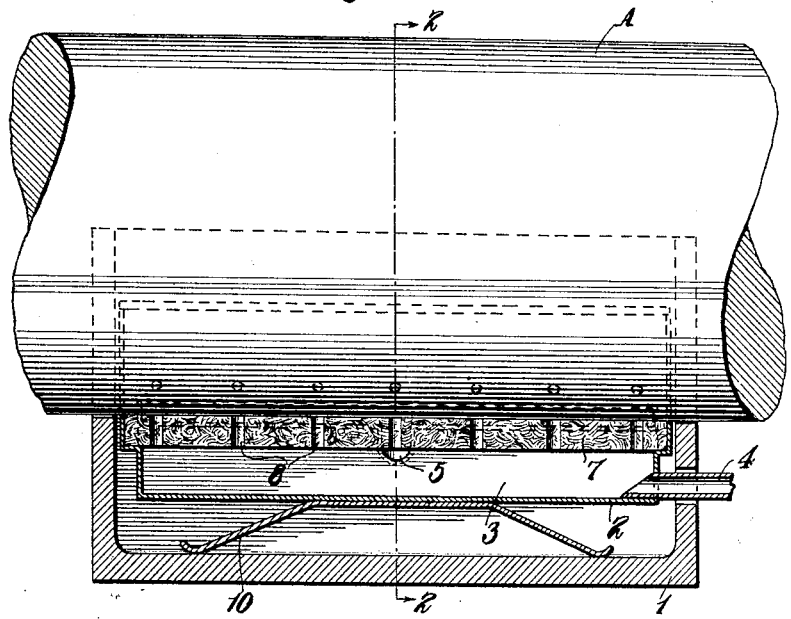
Figure 2:
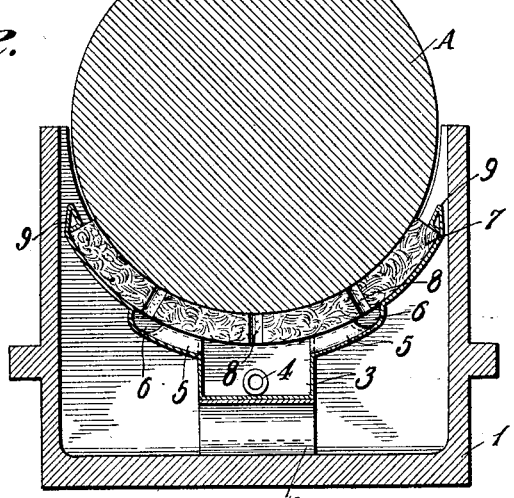

In these drawings:

Figure 1 is a vertical longitudinal section through a journal box provided with my invention, a fragment of an axle being shown in elevation therein; and Figure 2 is a vertical transverse section taken on the line 2—2 of Figure 1.

Having more particular reference to the drawings, in connection with which like characters of reference will designate corresponding parts, 1 represents the ordinary journal box lubricant retaining receptacle, or, as it is commonly known in the art, the packing cellar, and A, a fragment of an axle of a rolling stock provided therewith, which axle, as will be noted, is received in the cradle formed by the semi-circular recessing of the opposite end walls of the container 1, as shown in the drawings.

Heretofore, journal box lubrication has been effected by the placing of a wad of cotton or wool waste in the journal box cellar and then thoroughly saturating such waste with oil, which in turn will be conveyed and distributed over the bearing surfaces of the axle mounted therein due to contact of such waste with the same. The above arrangement presents numerous objectionable features, some of which are that the waste quite often becomes displaced by reason of the jar or vibration of the rolling stock during travel, that the waste at times does not properly contact with the bearing surfaces of an axle mounted in the journal box, and also that considerable expense and waste is incurred by the use of practically unlimited quantities of this cotton or wool waste material which, as hereinbefore stated, must be thoroughly saturated with the lubricating oil before the same will function in the desired manner.

My improved lubricating device consists of a sheet metal pan or tray, indicated in its entirety by the numeral 2, which, as will be noted, is of a shape and size to permit of its snug reception in the container 1, and is semi-circular in cross-section whereby to correspond to the curved peripheral bearing surfaces of that portion of the axle A engaged therein, as clearly shown in the Figure 2. A pocket or lubricant retaining well 3 is formed in this tray 2 and extends longitudinally throughout its length intermediately of the opposite sides, and is formed at one end with an opening into which the adjacent end of a filling tube or conduit 4 is introduced. The opposite end of the conduit 4 may be and preferably is connected to some form of lubricant reservoir, as for example, an oil cup, container, or other suitable device which will serve to replenish the supply of lubricant in said well 3 during distribution of lubricant about the peripheral bearing surfaces of the axle A. A pair of oppositely disposed transverse channels 5 are formed in the tray 2 on opposite sides and connecting with the well 3, and in turn, connect at their outer ends with longitudinal channels 6, these latter channels extending practically throughout the entire length of the tray.

As means for conveying the lubricant to the bearing surfaces of the axle A, and for evenly distributing the same thereover during rotation, a felt or other form of fibrous absorbent pad 7 is arranged in the transversely curved tray 2 and is formed with spaced series of perforations generally indicated by the numeral 8, certain of which perforations, as shown in the Figure 2, communicate with the longitudinal oil conveying channels 6, while the others communicate directly with the oil well 3. In order that this absorbent pad 7 will be positively held in contacting relationship with the axle A, and to prevent displacement of the same from the container 1, I may and preferably do form beading or flanges 9 on the opposite sides of the tray 2 against which the adjacent ends of said pad abut. Thus, it will be understood that the absorbent pad 7 will be, at all times, maintained in even and uniform contact with the axle A throughout its area.

A substantially arcuate leaf spring 10 is arranged upon the bottom of the channel box lubricant retainer 1, and yieldably supports thereon the tray 2 of my improved device, hence affording additional means for effecting the desired yieldable contact between the peripheral axles and the absorbent lubricating pad 7.

A journal box equipped with my improved type of lubricating device will receive an even and uniform film of lubricant over that portion of the bearing surfaces of the axle mounted therein from the lubricant saturated absorbent pad 7. This pad 7, in its turn, is supplied with lubricant from the tray 2, which, as hereinbefore mentioned, is provided with an intermediate longitudinal oil well 3 throughout its length and with transverse and longitudinal oil conveying channels 5 and 6 respectively. As lubricant is conveyed into the oil well 3 from the particular form of reservoir used in connection with the device, by way of the conduit 4, a portion of the same will be directed onto the lower side of the absorbent pad 7 from the well 3, while another portion thereof will be directed onto the outer portions of the pad by way of the transverse channels 5 and then the communicating longitudinal channels 6, the perforations 8 in the pad obviously facilitating the thorough saturation of the pad 7 with the lubricant in order that the desired lubricating film may be applied to the peripheral bearing surfaces of the axle A. Contact as between the bearing surfaces of the axle A and the absorbent pad will be constantly insured by reason of the upward thrust imparted to the tray 2 by the spring supporting element 9.

Manifestly, the construction shown is capable of considerable modification, and such modification as is within the scope of my claims I consider within the spirit of my invention.

I claim:

1. A device of the character described comprising a sheet metal tray curved transversely of itself and formed with an intermediate longitudinally disposed oil well extending throughout its length, lubricant supplying means connected to said well, a pair of oppositely disposed lubricant conducting channels formed in the tray and connected with said well, other oil conducting ways formed in the tray extending substantially parallel to said well and connecting with the outer ends of said first channels, and an absorbent pad supported by the tray receiving lubricant from said well and lubricating conducting channels.

2. In combination with an oil retaining container of a journal box, a tray yieldably supported therein having an intermediate oil well formed in the same and extending longitudinally throughout its length, a pair of oppositely disposed transverse channels formed in a portion of the tray and connecting with said well, a pair of longitudinal channels formed with the tray and connecting with the outer ends of said first channels, and an absorbent lubricant distributing pad arranged in the tray adapted to receive lubricant from said channels and well.

3. In combination with the lubricant container of a journal box, a transversely curved tray yieldably supported therein, having a depressed intermediate longitudinally extending lubricant well formed throughout its length, lubricant supplying means connected to said well, a depressed oppositely disposed pair of transverse channels formed in the tray connecting at their inner ends with the well, another pair of depressed longitudinally disposed channels formed in the tray connecting with the outer ends of said first channels, portions of the opposite sides of said tray being flanged, and a perforated absorbent lubricant distributing pad arranged in the tray connecting with said well and channels, and adapted to have yieldable contact with an axle arranged in the journal box.

In witness whereof I have hereunto set my hand.

JASPER NEWTON ROBERTSON.